(12) United States Patent
Glas

(10) Patent No.: US 11,091,167 B2
(45) Date of Patent: Aug. 17, 2021

(54) PROVIDING DRIVER ASSISTANCE

(71) Applicant: Bayerische Motoren Werke Aktiengesellschaft, Munich (DE)

(72) Inventor: Hubert Glas, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 335 days.

(21) Appl. No.: 16/240,992

(22) Filed: Jan. 7, 2019

(65) Prior Publication Data
US 2019/0135299 A1   May 9, 2019

Related U.S. Application Data

(63) Continuation of application No. PCT/EP2017/069527, filed on Aug. 2, 2017.

(30) Foreign Application Priority Data

Aug. 12, 2016 (DE) ...................... 10 2016 215 061.8

(51) Int. Cl.
*B60W 50/00* (2006.01)
*B60W 10/30* (2006.01)
(Continued)

(52) U.S. Cl.
CPC ..... *B60W 50/0098* (2013.01); *B60H 1/00771* (2013.01); *B60W 10/30* (2013.01); *E05F 15/695* (2015.01); *B60W 2050/0089* (2013.01); *B60W 2520/10* (2013.01); *B60W 2520/105* (2013.01); *B60W 2530/14* (2013.01); *B60W 2530/18* (2013.01); *B60W 2540/18* (2013.01)

(58) Field of Classification Search
CPC ............. B60W 50/0098; B60W 10/30; B60W 2050/0089; B60W 2520/10; B60W 2520/105; B60W 2530/14; B60W 2530/18; B60W 2540/18; E05F 15/695; B60H 1/00771
USPC .......................................................... 701/36
See application file for complete search history.

(56) References Cited

U.S. PATENT DOCUMENTS 5,266,948 A   11/1993 Matsumoto
6,108,602 A   8/2000 Bairamis
(Continued)

FOREIGN PATENT DOCUMENTS

CN   101334283 A   12/2008
CN   103802837 A   5/2014
(Continued)

OTHER PUBLICATIONS

International Search Report (PCT/ISA/210) issued in PCT Application No. PCT/EP2017/069527 dated Nov. 7, 2017 with English translation (seven (7) pages).
(Continued)

*Primary Examiner* — Gertrude Arthur Jeanglaude
(74) *Attorney, Agent, or Firm* — Crowell & Moring LLP

(57) ABSTRACT

A method provides driver assistance in a vehicle. The method records at least one movement pattern of a vehicle together with activated vehicle functions, wherein the movement pattern is created via odometry sensors. The method provides the respective vehicle function on the basis of detection of at least one part of the movement pattern previously recorded during a journey of the vehicle.

9 Claims, 1 Drawing Sheet

(51) Int. Cl.
    *E05F 15/695*     (2015.01)
    *B60H 1/00*     (2006.01)

(56) References Cited

U.S. PATENT DOCUMENTS

| | | |
|---|---|---|
| 2005/0274553 A1 | 12/2005 | Salman et al. |
| 2009/0005929 A1 | 1/2009 | Nakao et al. |
| 2015/0166069 A1 | 6/2015 | Engelman et al. |
| 2016/0328619 A1* | 11/2016 | Yl .......................... G06T 7/194 |
| 2017/0124781 A1* | 5/2017 | Douillard ......... G08G 1/096816 |
| 2017/0369074 A1 | 12/2017 | Mathes et al. |

FOREIGN PATENT DOCUMENTS

| | | |
|---|---|---|
| CN | 104724124 A | 6/2015 |
| DE | 691 11 573 T2 | 1/1996 |
| DE | 196 19 643 C1 | 7/1997 |
| DE | 101 07 280 A1 | 9/2002 |
| DE | 101 26 666 A1 | 12/2002 |
| DE | 101 49 283 A1 | 5/2003 |
| DE | 103 15 047 A1 | 10/2004 |
| DE | 10 2004 002 584 A1 | 8/2005 |
| DE | 10 2008 056 907 A1 | 5/2010 |
| DE | 10 2009 045 511 A1 | 4/2011 |
| DE | 10 2011 075 407 A1 | 11/2012 |
| DE | 10 2013 201 799 A1 | 8/2014 |
| DE | 10 2014 018 913 A1 | 6/2016 |
| EP | 2 017 774 A2 | 1/2009 |

OTHER PUBLICATIONS

German-language Written Opinion (PCT/ISA/237) issued in PCT Application No. PCT/EP2017/069527 dated Nov. 7, 2017 (three (3) pages).

German-language Search Report issued in counterpart German Application No. 10 2016 215 061.8 dated Apr. 18, 2017 with partial English translation (12 pages).

Chinese language Office Action issued in Chinese Application No. 201780029764.5 dated Dec. 16, 2020 with English translation (17 pages).

* cited by examiner

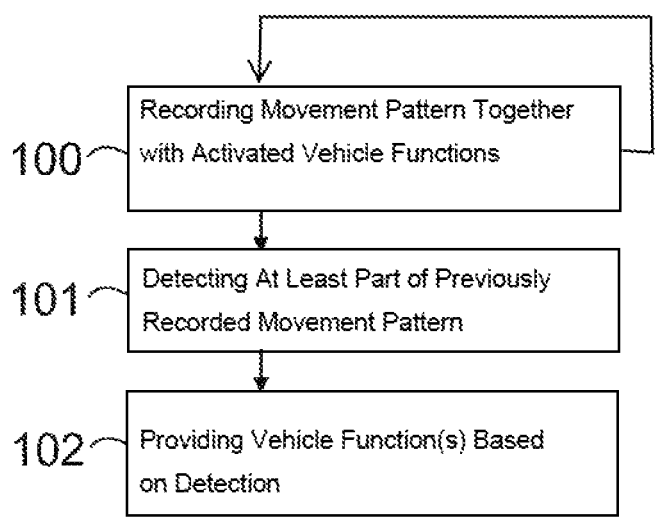

PROVIDING DRIVER ASSISTANCE

CROSS REFERENCE TO RELATED APPLICATIONS

This application is a continuation of PCT International Application No. PCT/EP2017/069527, filed Aug. 2, 2017, which claims priority under 35 U.S.C. § 119 from German Patent Application No. 10 2016 215 061.8, filed Aug. 12, 2016, the entire disclosures of which are herein expressly incorporated by reference.

BACKGROUND AND SUMMARY OF THE INVENTION

The invention relates to a method for providing driver assistance, which method resorts to reliable data sources and increases operating comfort of a vehicle. The present invention is also directed to a driver assistance system which is configured according to the method and to a vehicle having the driver assistance system. A computer program product having control instructions which implement the proposed method and operate the proposed driver assistance system is also proposed.

DE 10 2011 075 407 A1 shows a control system for controlling an operating state of a vehicle, which system carries out actions, for example closes the window or sliding roof, adjusts the air-conditioning system or defines the threshold value for the anti-trap protection of the automatic window system, on the basis of speed data, GPS data and/or weather data (currently determined and empirical values).

DE 19 619 643 C1 shows control of functions based on navigation data. This functionality is supplemented by DE 10 315 047 A1 by virtue of the user being able to teach the system functional sequences on the basis of the position, with the result that these sequences can take place in an automated manner at later times.

DE 10 2008 056 907 A1 likewise describes a teachable system which can control any desired vehicle components with knowledge of the current vehicle position. However, the user must himself define here what should happen at what positions.

DE 10 2004 002 584 A1 shows a system which opens and closes windows and the roof/sliding roof on the basis of the number of received satellite signals (GPS, Glonass, GNSS and future systems). Further vehicle functions, for example the switching on/off of the headlamps, can also be coupled to this action. In order to prevent the unwanted automatic system action, an additional switch is provided and provides the driver with the possibility of aborting the automatic action at any time.

Many simultaneous actions by the driver are required, under certain circumstances, in different traffic situations. For example, when entering a tunnel, the vehicle must be controlled, windows and the sliding roof must be closed at the same time, the air-conditioning system must be set to air circulation mode and the headlamps must be switched on.

Known methods address the problem of the automatic, situation-dependent control of vehicle components, in particular the vehicle shell. Basic elements are required for this purpose, such as functional logic, which stipulates the control parameters, and a control unit which carries out an action on the basis of these data.

The disadvantage of systems according to the prior art is that they are based on data from systems which belong to the technically complicated special equipment of vehicles, for example navigation data, weather data or data from the Internet. These can therefore be used only in vehicles which have this technically complicated special equipment. Furthermore, systems according to the prior art require a connection of the vehicle to satellites, the Internet or any other external information source. Therefore, they cannot operate exactly if signals are interrupted, for example in long tunnels or underground garages. Previous teachable or pre-programmable systems typically require interaction of the user, either before the start of the journey or during the journey, for example in order to activate the learning mode.

Therefore, an object of the present invention is to provide a method for providing driver assistance, which method resorts to reliable data sources and increases operating comfort of a vehicle. An object is also to provide a driver assistance system which is configured according to the method and a vehicle having the driver assistance system. An object is also to provide a computer program product having control instructions which implement the proposed method and operate the proposed driver assistance system.

Accordingly, a method for providing driver assistance is provided, which method comprises the following steps, namely recording at least one movement pattern of a vehicle together with activated vehicle functions, and providing the respective vehicle function on the basis of detection of at least one part of a movement pattern which has already been recorded during a journey, wherein the movement pattern is created by way of odometry sensors.

The driver assistance is provided in such a manner that either the vehicle functions are carried out directly or are suggested to the user and the latter can accept them. In this case, driver assistance controls at least one functionality of the vehicle. In this case, it is not essential for the driver assistance system to actually assist with the driving per se, but rather any functions which can be controlled directly or indirectly via the driver assistance system can be offered to the user, that is to say the driver.

The recording of at least one movement pattern of a vehicle together with activated vehicle functions corresponds to storage of driving parameters together with those functions which have been initiated by the driver. The initiation is typically carried out manually, in which case it is inferred that the driver would initiate this function again in the same situation. Driving parameters are therefore recorded in preparatory method steps according to the invention and, if there is a sufficient match of driving parameters measured during a journey, it is detected that the same route has already been driven on or the same situation has already occurred. It is therefore possible to offer the driver the situation in which the same functions are carried out with his approval or in an automated manner.

The respective vehicle function or a plurality of vehicle functions is/are provided on the basis of recognition of at least one part of a movement pattern which has already been recorded, that is to say either a section or a situation which has already been driven through. A behavior of the driver can therefore be assigned to a route or a situation and this behavior can be carried out again.

Since the movement pattern is created using odometry sensors, the vehicle behavior is observed over a predefined period and the vehicle data are stored. Therefore, odometry sensors according to the invention are considered to be all sensors which pick up a driving behavior and/or vehicle parameters. A person skilled in the art knows a plurality of sensors for this purpose which measure parameters of further components, for example. These components are preferably the engine, the steering wheel, a brake, tires or tire parts, wheel speed sensors, acceleration and rotation rate sensors and generally all vehicle components which allow conclusions to be drawn on a vehicle movement which has been covered.

A movement pattern of a vehicle comprises routes, sections, bends, speeds, a braking behavior, an acceleration behavior, a steering behavior, an arbitrary sequence of odometry data which have already been processed and so on. For example, a movement pattern is a sequence of a route having a first length together with a slight bend. This is followed by a second, straight route. Then there is a sharp bend with a corresponding braking behavior. If these partial movement patterns or the movement pattern overall is/are recognized, one or more vehicle functions can be offered.

The present invention is generally directed to vehicles having any desired drive concepts, for example electric vehicles, vehicles having an internal combustion engine or hybrid vehicles. In this respect, motor vehicles together with driver assistance systems are generally developed according to the invention. The term "vehicle shell" should be understood as meaning a generic term for the outer components of the vehicle. In this case, the components of the vehicle provide a vehicle function.

According to one aspect of the present invention, new functional logic is presented below, which functional logic either independently carries out vehicle functions or suggests options for vehicle functions to the driver, which are carried out after confirmation by the driver.

According to the invention, the functional logic is based on odometric data, for example the route traveled, the position and orientation of the vehicle in a global coordinate system, a curvature, a side slip angle, the steering wheel angle, etc. Movement patterns of the vehicle are learned therefrom by storing recurring sequences, that is to say an identical sequence of odometric data. According to one aspect of the present invention, the learning process is carried out in a completely automatic manner in the background from the point of view of the driver, without interaction from the driver, and therefore differs from known methods, as shown in DE 10 315 047 A1 for example, in which the driver must himself initiate the learning process. This disadvantage is overcome according to the invention.

In the context of the present invention, odometry denotes a method of estimating the position and orientation of a vehicle on the basis of the data from the respective drive system, the steering and inertial sensors. One example of this is the number of wheel revolutions taking into account their dimensions. In the present case, odometry denotes at least one functionality which detects the position, orientation and the driving state of a vehicle at particular times of the journey. For this purpose, the odometry sensors monitor the chassis together with the respective wheel rotation, the direction, accelerations, rotation rates and the steering together with the wheel steering angle and the steering wheel angle. A stretch without reception, such as stretches of tunnel, can therefore be bridged and data from further sensors can be verified.

The learning process can take place according to the invention in such a manner that the odometry is tracked, that is to say monitored, over several seconds and is stored if a window or roof window is operated. The more frequently the corresponding event is repeated, the more precisely the functional logic can predict future actions. On the basis thereof, either certain vehicle functions should then take place automatically, for example the window or roof should be actuated, or these actions should be at least suggested to the driver.

One possible exemplary embodiment is driving a vehicle out of an underground garage with fixed parking spaces. The driving movement will always take place immediately after the engine is started, with the result that the proposed functional logic can recognize the movement pattern and can carry out an action at the correct moment, for example shortly before the gate or barrier is reached, which action is always required at this point, for example opening the window on the driver's side so that the driver can open the barrier using the parking ticket. The subsequent continuation of the journey may likewise be recognized, with the result that the window is automatically closed. At this moment, the driver must hold the steering wheel and engage a gear. He therefore no longer has a hand free to actuate the button for opening the window himself.

If driving a vehicle into a parking space is involved, for example at the end of the commute, this can also be recognized as a movement pattern since the commute is normally the same every day.

Another possible embodiment according to one aspect of the present invention can be designed in such a manner that suggestions for functions are presented to the driver on the basis of the recognized movement pattern. These suggestions can then be confirmed in various ways, with the result that the vehicle carries out the action(s). Contemplated possibilities for confirmation are, for example, integration in a driver assistance system, gesture control or else tapping on a touch display.

In contrast to the prior art, the odometry-based position detection is not dependent on special equipment and can also function independently of time, weather and satellite data. In order to improve the accuracy, however, it can be coupled to further data if the corresponding vehicle has suitable systems. According to one aspect of the present invention, this functional logic can be coupled solely to non-safety-relevant functions, with the result that it results only in an improvement in the operating comfort.

It is therefore particularly advantageous according to the invention that the operating comfort is increased by reducing the necessary actions by the driver, wherein a plurality of actions can be carried out at the same time and a plurality of actions are initiated with only one button press, interaction or other confirmation. It is therefore also possible to dispense with user interaction in the automatic mode.

One aspect of the present invention provides self-learning functional logic which functions in a manner dissociated from satellite data and is therefore also suitable for vehicles without a navigation system and does not require any action by the user to learn movement schemes. The time of the action or of the suggestion for the action is learned and optimized in a completely automatic manner according to the invention. Predictions become more precise with an increasing data set. The functional logic functions even when there is no connection to an external signal source.

According to one aspect of the present invention, a vehicle function comprises moving at least one vehicle window, controlling an air-conditioning system, controlling a ventilation system, controlling at least one vehicle light and/or controlling a comfort function. This has the advantage that any vehicle function, for example a window lifter or a roof window, can be actuated. In particular, a plurality of said components can also be addressed at the same time. In this case, all components which can be directly or indirectly addressed by means of a driver assistance system are contemplated.

According to another aspect of the present invention, the provision of the respective vehicle function comprises automatically triggering the vehicle function or triggering the vehicle function on the basis of a user input. This has the advantage that the vehicle functions are performed automatically or else the user is requested to authorize the performance. The driver can therefore have the offered functions performed by way of a voice input, a key press or by touching a touch-sensitive display. Any man-machine interface can be used for this purpose, for example gesture control.

According to another aspect of the present invention, a length of a route covered, steering wheel angles, wheel rotations, a direction of travel, rotation rates, accelerations and/or vehicle parameters are captured using at least one odometry sensor. This has the advantage that it is possible to use sensors which can always be kept available without interruption in a vehicle. There is thus no need for a data connection which can be disrupted or distorted. Furthermore, it is advantageous to have the odometry sensors available in a redundant manner such that, if a sensor fails, at least one further sensor replaces it. Furthermore, sensor data can be checked in this manner since a plurality of sensors can respectively separately provide a value and reference data for the same expected value are therefore available.

According to another aspect of the present invention, the detection of at least one part of a movement pattern which has already been recorded comprises comparing captured movement patterns with stored movement patterns, wherein both substantially match. This has the advantage that the movement pattern need not be completely correctly recognized, but rather it is possible to provide a threshold value which requires a required degree of matching. For example, a route having identical lengths and bend inclinations which matches a stored route with a high percentage is recognized. If the high percentage of the match of a route currently being measured and a stored route is present, it is possible to offer or carry out the same functions as were also activated when the route was first driven through.

According to another aspect of the present invention, the data from the odometry sensors are supplemented with data from further sensors. This has the advantage that data can be verified or even refined. The odometry data can thus also be checked and extended. In particular, sensors can therefore be calibrated.

According to another aspect of the present invention, the recording of at least one movement pattern of a vehicle together with activated vehicle functions comprises recording the times which indicate when the respective vehicle function was activated, and the provision of the respective vehicle function respectively takes this time into account. This has the advantage that, if a situation or a route is recognized, the respective function can be offered or carried out at exactly the right time. A temporal sequence of activation times which is assigned to individual points of the movement pattern is therefore linked to each movement pattern.

According to the invention, a driver assistance system provides driver assistance, having a sensor unit set up to record at least one movement pattern of a vehicle together with activated vehicle functions, and an output unit set up to provide the respective vehicle function on the basis of detection of at least one part of a movement pattern which has already been recorded during a journey, wherein the movement pattern is created using odometry sensors. In this case, the proposed method steps are structurally reproduced.

Also according to the invention, a vehicle having the proposed driver assistance system is provided.

Still further according to the invention, a computer program product having control instructions which implement the proposed method and operate the proposed driver assistance system is provided.

According to the invention, it is particularly advantageous that the method can be used to operate the proposed driver assistance system together with its units. The proposed apparatuses and devices, that is to say the driver assistance system, are also suitable for carrying out the method according to the invention. The apparatus therefore respectively implements structural features which are suitable for carrying out the corresponding method. However, the structural features can also be configured as method steps. The proposed method also has available steps for implementing the function of the structural features.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic flowchart of a method for providing driver assistance according to one aspect of the present invention.

DETAILED DESCRIPTION OF THE DRAWING

FIG. 1 shows a schematic flowchart of a method for providing driver assistance, having the steps of recording 100 at least one movement pattern of a vehicle together with activated vehicle functions, and providing 102 the respective vehicle function on the basis of detection 101 of at least one part of a movement pattern which has already been recorded during a journey, wherein the movement pattern is created 100 using odometry sensors.

A person skilled in the art recognizes here that individual method steps can be carried out iteratively. For example, the recording 100 of at least one movement pattern can be repeated as often as desired so that sufficient reference data are available. This method step can also be carried out by the manufacturer in such a manner that the movement patterns are available in a data memory and are delivered with a vehicle or the driver assistance system. The movement patterns can therefore be stored in a data memory.

Furthermore, the individual method steps can be implemented as structural features of the driver assistance system, and so FIG. 1 similarly also shows a block diagram of the driver assistance system together with corresponding units.

A data memory or a computer-readable medium with a computer program product having control instructions which implement the proposed method and operate the proposed driver assistance system is not shown in the present case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing driver assistance in a vehicle, the method comprising the acts of:
   recording using a vehicle driver assistance system at least one movement pattern of a vehicle during which an activation of a vehicle function by a user occurs, wherein the at least one movement pattern is created via odometry sensors;

determining using the vehicle driver assistance system whether a current vehicle movement pattern corresponds to a part of the recorded at least one vehicle movement pattern which included the activation of the vehicle function; and based on a determination in the determining act by the vehicle driver assistance system that the current vehicle movement pattern corresponds to the part of the recorded at least one vehicle movement pattern, activating the vehicle function by the driver assistance system.

2. The method as claimed in claim 1, wherein the vehicle function comprises one or more of: moving at least one vehicle window, controlling an air-conditioning system, controlling a ventilation system, controlling at least one vehicle light, and controlling a comfort function.

3. The method as claimed in claim 1, wherein the activating of the vehicle function comprises automatically triggering the vehicle function or triggering the vehicle function on the basis of a user input.

4. The method as claimed in claim 1, wherein one or more of:

a length of a route covered, steering wheel angles, wheel rotations, a direction of travel, accelerations, rotation rates, and vehicle parameters, are captured using at least one odometry sensor.

5. The method as claimed in claim 1, wherein data from the odometry sensors are supplemented with data from further sensors.

6. The method as claimed in claim 1, wherein the recording act includes recording times which indicate when the vehicle function was activated, and the activating act includes taking into account the recorded times the vehicle function was activated during the recording act.

7. A driver assistance system for providing driver assistance, comprising:

a sensor unit configured to record at least one movement pattern of a vehicle with the aid of odometry sensors during which an activation of a vehicle function by a user occurs; and an output unit configured to determine whether a current vehicle movement pattern corresponds to a part of the recorded at least one vehicle movement pattern which included the activation of the vehicle function, and based on a determination in the determining act by the output unit that the current vehicle movement pattern corresponds to the part of the recorded at least one vehicle movement pattern, activate the vehicle function by the driver assistance system.

8. A vehicle, comprising a driver assistance system as claimed in claim 7.

9. A computer program product comprising a computer readable medium having stored thereon program code segments that, when executed by a processor, carry out the acts of:

recording using a vehicle driver assistance system at least one movement pattern of a vehicle during which an activation of a vehicle function by a user occurs, wherein the at least one movement pattern is created via odometry sensors;

determining using the vehicle driver assistance system whether a current vehicle movement pattern corresponds to at least a part of the recorded at least one vehicle movement pattern which included the activation of the vehicle function; and based on a determination in the determining act by the vehicle driver assistance system that the current vehicle movement pattern corresponds to the part of the recorded at least one vehicle movement pattern, activating the vehicle function by the driver assistance system.

\* \* \* \* \*